United States Patent [19]

Maeda

[11] 3,716,969
[45] Feb. 20, 1973

[54] CONTINUOUS MOVING LAYER TYPE ADSORPTION DEVICE

[75] Inventor: Isamu Maeda, Niihama-shi, Japan

[73] Assignee: Sumitomo Jukikai Kogyo Kabushiki Kaisha, Tokyo, Japan

[22] Filed: Dec. 10, 1971

[21] Appl. No.: 206,815

[30] Foreign Application Priority Data

Dec. 10, 1970 Japan..............................45/108933

[52] U.S. Cl....................................................55/390
[51] Int. Cl. .............................................B01d 53/06
[58] Field of Search......................55/73, 77, 79, 390

[56] References Cited

UNITED STATES PATENTS 2,684,928  7/1954  Berg.........................................55/390
5,405,508 10/1968  Peters et al.............................55/390

Primary Examiner—Charles N. Hart
Attorney—Sughrue, Rothwell, Mion, Zinn & Macpeak

[57] ABSTRACT

A continuous moving layer adsorption device employed in an exhaust gas desulfurization system is made of an adsorption vessel as the main body filled with activated charcoal and a rectifying device included therein, the adsorption vessel main body comprising a side wall provided with a number of louvers and located at the gas-introducing side of the vessel, another side wall having delivery holes located at the gas-exhausting side of the vessel, the distance between the gas-introducing side wall and the gas-exhausting side wall being larger toward the downward portion of the vessel, a hopper-like portion provided adjacently below the two side walls, and an elongated port provided at the bottom of the hopper-like portion for delivering the activated charcoal; and the rectifying device comprising a rectifying body placed in the hopper-like portion and a rectifying place extended downwardly from the rectifying body.

10 Claims, 6 Drawing Figures

3,716,969

CONTINUOUS MOVING LAYER TYPE ADSORPTION DEVICE

BACKGROUND OF THE INVENTION

1. Field of the Invention

This invention generally relates to a desulfurization system wherein exhaust gas caused by combustion is passed through an adsorption vessel filled with activated charcoal and the $SO_2$ gas contained in the exhaust gas is adsorbed into the charcoal, and more particularly to a particular construction of the adsorption vessel which enables desulfurization to be performed continuously.

2. Description of the Prior Art

In the case where the $SO_2$ gas is adsorbed into the charcoal filling of the adsorption vessel, it is natural that there is a limitation in the adsorbing ability of the activated charcoal. Thus, as the charcoal approaches its limitation of adsorption, it must be replaced by new material.

However, it is desirable that the desulfurization be operated continuously without interruption, thus maintaining a constant adsorption capability because the desulfurization device is ordinarily directly coupled to an exhaust gas source, such as a boiler. In other words, the activated charcoal must be replaced continuously, for instance, in such a manner that the deteriorated charcoal be continuously removed from the lower portion of the adsorption vessel, regenerated in the subsequent expelling and cooling tanks, and circulated to the inlet port of the adsorption vessel.

Heretofore, the adsorption vessel has been so constructed that a box-like vessel is at its lower portion narrowed into a hopper-like configuration and an exhaust valve is provided at the narrowed portion. Both sides of the box-like vessel through which the gas is introduced and delivered are made of a porous plate or a mesh-plate. Because of the above-described construction of the conventional adsorption vessel, however, there have been found the drawbacks of causing a center-dropping phenomenon or suspension phenomenon in the filler layers inside of the adsorption vessel.

Herein, the center-dropping phenomenon is defined to be a phenomenon wherein the centrally located portion in the layers of the activated charcoal just above the exhausting port falls down prematurely, and the suspension phenomenon is defined to be a phenomenon wherein the activated charcoal filled inside of the adsorption vessel is suspended in a crust-like configuration caused by a lateral compressive force, both of which will be described hereinafter in more detail.

SUMMARY OF THE INVENTION

A primary object of the present invention is to provide an adsorption vessel wherein the above described drawbacks can be substantially eliminated.

Another object of the present invention is to provide an adsorption vessel containing continuously moving layers of activated charcoal, whereby the charcoal can be replaced continuously.

A further object of the present invention is to provide an adsorption vessel adapted to be employed in a desulfurization system of a continuously operable type wherein, the above described center-dropping phenomenon or suspension phenomenon does not occur.

The above described and other objects of the present invention can be achieved by an improved construction of the adsorption device comprising a main body of an adsorption vessel filled with activated charcoal and a rectifying device, said main body further comprising a side wall provided with a number of louvers and located at the gas-introducing side of the vessel, another side wall having delivery holes located at the gas-exhausting side of the vessel, the distance between the gas-introducing side wall and the gas-exhausting side wall being made larger toward the downward portion of the vessel, a hopper-like portion provided adjacently below said two side walls, and an elongated port provided at the bottom of said hopper-like portion for delivering said activated charcoal; and said rectifying device comprising a rectifying body placed in said hopper-like portion and extended along the whole length of the elongated delivery port, said rectifying body being formed into a triangular cross-section having two downwardly tapered side surfaces and a ridge line at the top, and a rectifying plate extended downwardly from the rectifying body vertically.

The nature, principle, and utility of the present invention will be more clearly understood from the following detailed description of the invention when read in conjunction with the accompanying drawings.

DETAILED DESCRIPTION OF THE INVENTION

Detailed Description of the Drawings

Figure 1:
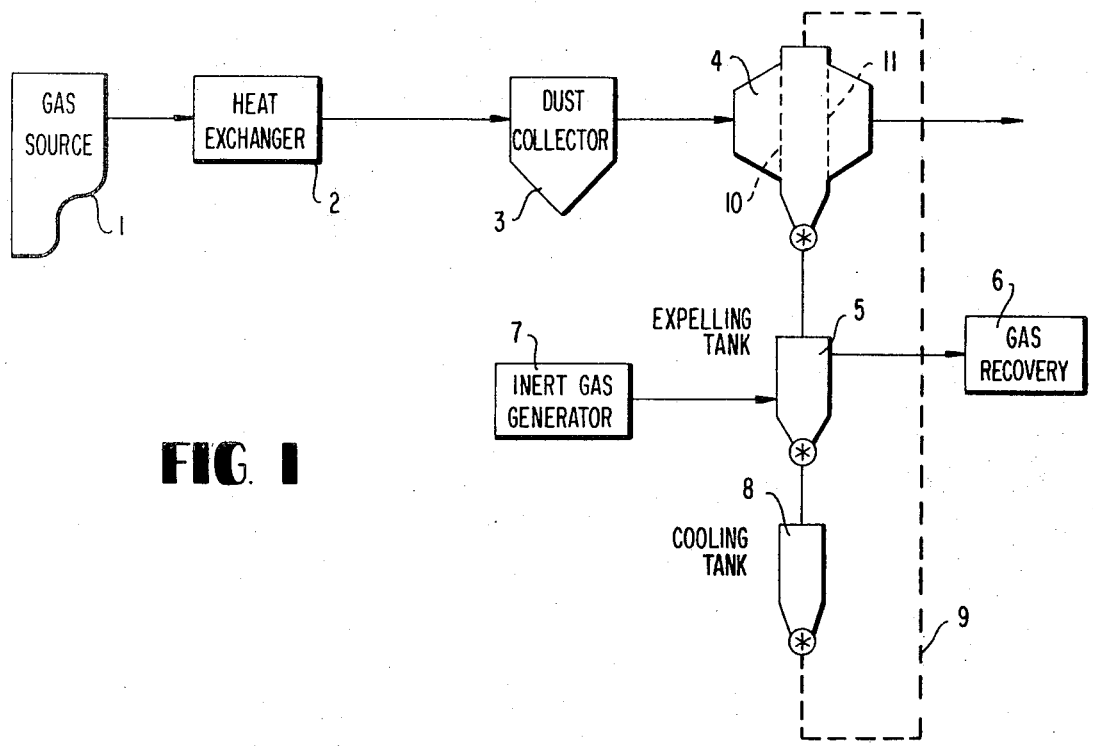
FIG. 1 is a flow sheet showing the organization of the desulfurization system in which an adsorption vessel according to the present invention is to be used.

Referring now to FIG. 1 showing the organization of the desulfurization system in which the adsorption vessel according to the present invention is to be employed, there is indicated that the combustion exhaust gas from a source 1, such as a boiler is passed through a heat exchanger 2 so that the exhaust gas is adjusted as for the temperature suitable for the adsorption of $SO_2$ gas (about 120°C). The gas is thereafter passed through a dust collector 3 and then introduced into an adsorption vessel 4. The activated charcoal saturated by the $SO_2$ gas is supplied to an expelling tank 5 to expel the $SO_2$ gas adsorbed in the adsorption vessel 4 and then passed to a cooling tank 8. In the expelling tank 5, an inert gas obtained from an inert gas generating device 7 and heated to a temperature adapted to expel $SO_2$ gas from the activated charcoal (in a range of from 350°C to 400°C) is circulated. The SO₂ gas thus expelled from the charcoal is sent out of the tank 5 together with the inert gas into an SO₂ gas recovering device 6 provided in the subsequent stage. The above mentioned inert gas generating device 7 is composed of an inert gas generating furnace, temperature regulating device, and a supplying fan. The activated charcoal from which the adsorbed SO₂ gas has been expelled as described above is then sent to a cooling tank 8 provided in the following stage of the SO₂ gas expelling tank 5. Numeral 9 designates a lifting conveyor made of, for instance, a combination of a conveyor and a bucket elevator and sending back the thus regenerated activated charcoal from the cooling tank 8 to the adsorption vessel 4.

Figure 2:
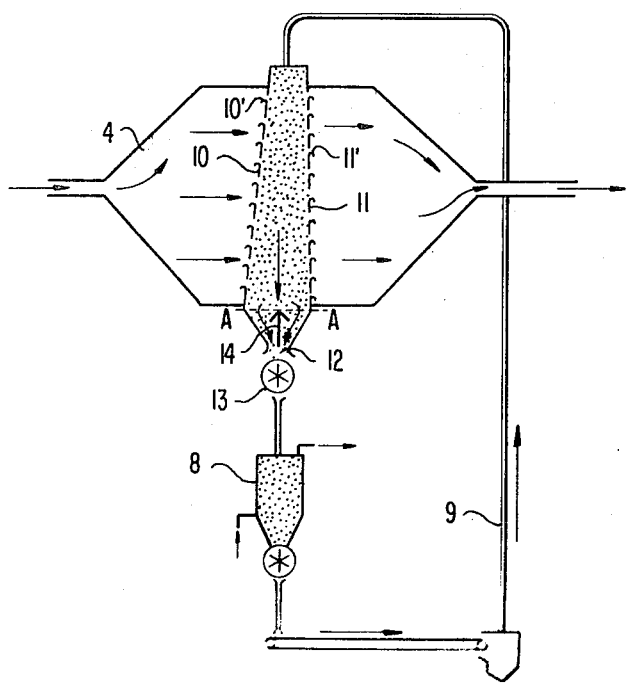
FIG. 2 is a schematic profile view, partly in section, of an adsorption vessel of the present invention.
Figure 3:
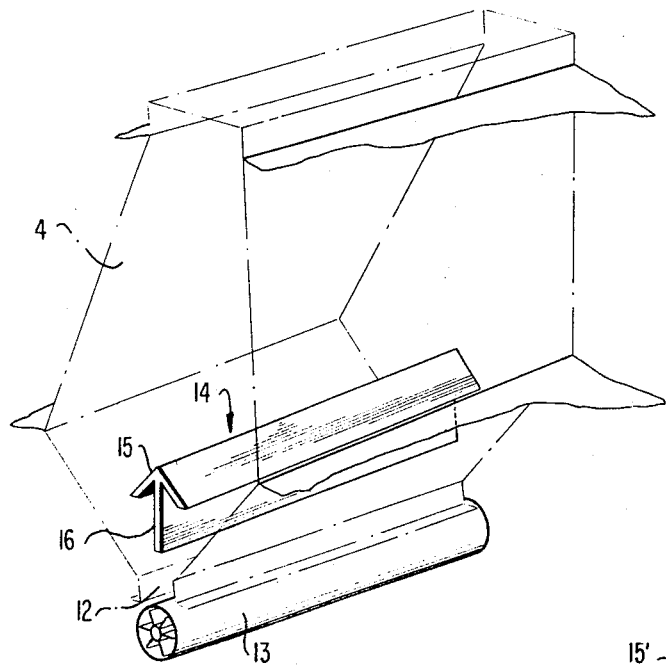
FIG. 3 is a perspective view of the adsorption vessel shown in FIG. 2.

In FIGS. 2 and 3, there is indicated a construction of the adsorption vessel 4. At the central portion of the adsorption vessel 4, there is provided a chamber filled with the activated charcoal, and both side walls 10 and 11 of which are made in the form of louver boards. The gas exhausted from a combustion chamber is introduced into and delivered from the chamber bound by the walls 10 and 11 and filled with the activated charcoal as indicated by the arrow marks in FIG. 2. Herein, it should be noted that the louvered wall 10 at the introduction side of the chamber is tapered in such a manner that the distance between the wall 10 and the delivering side wall 11 is enlarged toward the downward portion of the chamber, and for this reason, the layers of the activated charcoal filled inside of the chamber are made thicker toward the downward portion of the chamber when the thicknesses are measured along the flow of the gas.

The louvered walls 10 and 11 are provided with a number of louver pieces 10′ and 11′, respectively, the outwardly directing edges of which are curved for smoothening the stream of the gas flow and also for stiffening the louver pieces. Although the introducing side of the wall 10 is indicated to be tapered slightly, while the delivery side wall 11 is extended vertically, the relation may also be reversed, such that the introducing side wall 10 is extended vertically and the delivery side wall 11 is tapered slightly. Likewise, both of the walls 10 and 11 may be slightly tapered so that the distance between these walls is enlarged toward downwardly. The lower portion of the chamber filled with the charcoal, which is adjacent downwardly to the side walls 10 and 11 is narrowed or reduced in its width in a hopper-like configuration having an elongated exit port 12 with the longitudinal axis thereof extending along the whole length of the chamber, in a direction vertical to the plane of the drawing, and a charcoal remover 13 of, for instance, a rotary feeder type is provided at the exit port 12.

Although in FIGS. 2 and 3, the exit port 12 is indicated to be opening downwardly with the longitudinal axis thereof extending at a right angle against the flowing direction of the gas, the longitudinal axis of the exit port 12 may also be extended along the flowing direction of the gas when such a construction is suitable to the configuration of the charcoal filled chamber. Although the charcoal filled chamber has been explained for the case where the cross section thereof cut along the flow line of the gas is rectangular, this may be of square, oval, or any other configuration, if such a construction adapts the required conditions. In an industrial application, however, the rectangular cross section shown in FIGS. 2 and 3 is preferable. Furthermore, although the delivery side wall 11 of the charcoal filled chamber has also been indicated as louvered, this may be constructed into a wall having mesh-like holes or into a porous plate or any other configuration adapted for the purpose.

A rectifying device 14 is then provided within the hopper-like portion 12 in such a manner that the device 14 is extended along the whole length of the exit port 12. The rectifying device 14 further comprises a roof-like triangular rectifying body 15 and a rectifying plate 16 suspended vertically downwardly from the rectifying body 15. In the indicated example, the longitudinal axis of the exit port 12 and hence the extended direction of the rectifying device 14 is perpendicular to the flowing direction of the exhaust gas.

Figure 6:
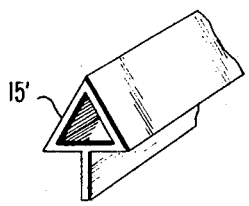
FIG. 6 is a perspective view showing an example of a rectifying device employed in the adsorption vessel according to the present invention.
Figure 4:
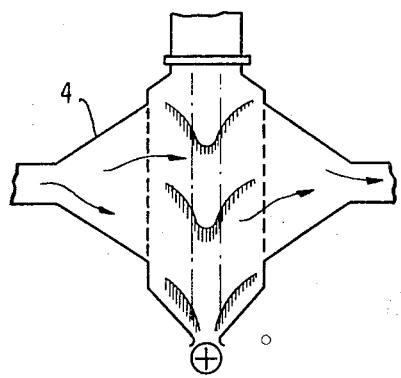
FIG. 4 is a view for explaining the center-dropping phenomenon.
Figure 5:
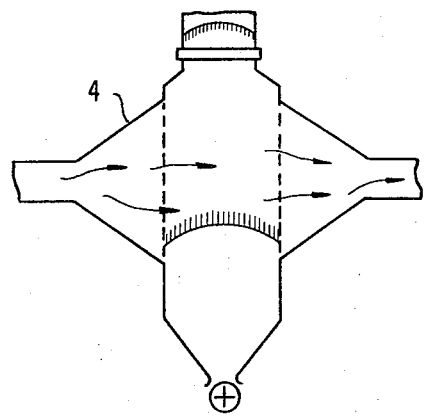
FIG. 5 is a view for explaining the suspension phenomenon.

The above described taper of the side walls of the charcoal filled chamber is so selected that an angle of from 6° to 20° is formed between the two side walls. When the angle is enlarged more than 20°, the required amount of activated charcoal is too much and the size of the hopper-like portion and the rotary feeder must be enlarged. Furthermore, the difference in the dropping velocities of the activated charcoal layers becomes exceedingly great, and the effect of compensating the lowering of the adsorption efficiency cannot be sufficient. For this reason, the above described taper angle is more preferably selected in a range of from 7° to 12°, and at best 9°–10°. The rectifying body 15 is provided within the hopper-like portion of the charcoal filled chamber, and it is preferable that the upper ridge of the rectifying body 15 is aligned with a line A—A in FIG. 2 connecting the upper flexing points of the hopper-like portion. The rectifying body 15 may also be made in the form of a triangular body 15′ shown in FIG. 6, and an angle formed by the two side surfaces of the triangular body 15 or 15′ is selected at a range of from 30° to 60°.

The length of the bottom side of the triangular body 15 or 15′ is preferably selected to a value larger than the width of the exit port 12, and the tapered angles of both sides of the triangular body are determined to be substantially equal to the tapered angles of both sides of the hopper-like portion. That is, both sides of the triangular rectifying body 15, 15′ and the both sides of the hopper-like portion are determined to be substantially parallel with each other, so that the descending velocities of the charcoal in both sides of the rectifying device 14 within the hopper-like portion are made substantially equal. The height of the rectifying plate 16 is selected to be sufficient for being extended to a position where the downwardly streaming charcoal at both sides of the rectifying body 15, 15′ are directed substantially downwardly. In addition, the rectifying plate 16 should not always be just underneath the upper edge of the triangular configuration, but may be displaced to either side nearer to the introduction side or the delivery side of the gas flow, provided the displacement of the rectifying plate 16 does not interfere the flow of the charcoal at that portion.

The activated charcoal employed in the present invention may be of powdery structure or pulverized (granular) structure, and the adsorption device according to the present invention can be employed in either of the cases where the charcoal is moved downwardly without intermission or where it is descended intermittently at a predetermined amount for each time.

The operation and advantageous effects of the present invention will now be described.

Since the chamber filled with the charcoal is so constructed that at least one of the side walls is tapered, the activated charcoal fills the inside of the chamber in such a manner that the thickness thereof measured along the flow direction of the gas is thicker in the lower portion of the chamber then in the upper portion. That is, the profile view in the section of the charcoal filled chamber is made into a frustoconical configuration. Accordingly, the laminar pressure acting between each layer of the charcoal causes a lowering force for descending the charcoal, whereby the downward movement of the charcoal can be carried out smoothly. In other words, the above described suspension phenomenon can be prevented substantially, and the possibility of causing mesh-clogging by dust in the exhaust gas filling inside of the thus suspended charcoal can be altogether eliminated.

Furthermore, the charcoal loses its adsorption ability while it is moved from the upper portion to the lower portion of the charcoal filled chamber. However, in the construction of the adsorption device according to the present invention, since the thickness of the chamber along the flowing direction of the gas is enlarged toward the downwardly portion, the above described decrease of the adsorption ability of the charcoal can be compensated by the increase in the thickness of the charcoal chamber.

Likewise, because of the provision of the rectifying body 15 or 15', the pressure of the charcoal layers located above the exit port 12 is borne by the two tapered surfaces of the rectifying body 15 or 15', whereby the charcoal layers are along their whole sectional portions supported by the side surfaces of the hopper-like portion and the two tapered surfaces of the rectifying body, and the above described center-dropping phenomenon can be thereby prevented. The rectifying plate 16 is provided for eliminating the interference between the two downward streams of charcoal created at both sides of the rectifying device 14, and any malicious effect caused on one of the downward stream by the other downward stream of the charcoal can be substantially eliminated. Thus the downward stream of the charcoal can be exhausted without any disturbance, even if the flow rates of the two streams are different from each other.

Although the operation and advantageous effects of the present invention have been described hereinabove, a surprising fact in this invention is that the layers of the activated charcoal considered in a vertical plane parallel to the gas flow can be descended altogether maintained in parallel. This fact was found true after numerous experiments with the exhaust speed of the charcoal being varied in each of the experiments. That is, all of the layers of the charcoal were descended while the disposition of the layers was maintained as it was. Because of this fact, not only the above described center dropping phenomenon and the suspension phenomenon can be completely prevented, but also a uniform adsorption can be maintained throughout the adsorption vessel. Furthermore, the pressure loss caused in the gas flow by the existence of the adsorption vessel can be decreased by preventing the clogging of gaps between each of the granules of the activated charcoal by the dust in the exhaust gas. In addition, because of the uniform and constant circulation of the activated charcoal, the consumption of the charcoal can be substantially reduced. Thus, it is apparent that the continuous operation of the adsorption device can be advantageously carried out with the activated charcoal being regeneratively circulated back to the inlet port of the adsorption vessel.

Although the present invention has been sufficiently described in the foregoing specification and examples included therein, it is readily apparent that various changes and modifications may be made by those skilled in the art without departing from the spirit and scope thereof.

What I claim is:

1. A continuous moving layer type adsorption device employed in a gas desulfurization system, comprising:
   a. an adsorption vessel main body filled with activated charcoal, and
   b. a rectifying device, said adsorption vessel main body further comprising:
      1. a side wall provided with a number of louvers and located at the gas-introducing side of the vessel,
      2. another side wall having delivery holes located at the gas-exhausting side of the vessel, the distance between the gas-introducing side wall and the gas-exhausting side wall being made larger toward the downward portion of the vessel,
      3. a hopper-like portion provided adjacently below said two side walls, and
      4. an elongated port provided at the bottom of said hopper-like portion for delivering said activated charcoal, said rectifying device comprising:
         i. a rectifying body placed in said hopper-like portion and extended along the whole length of the elongated delivery port, said rectifying body being formed into a triangular cross-section having two downwardly tapered side surfaces and a ridge line at the top, and
         ii. a rectifying plate extended downwardly from the rectifying body vertically.

2. The adsorption device of claim 1, wherein the upper edge of each of the louvers of said side wall is bent outwardly from the adsorption vessel filled with the activated charcoal.

3. The adsorption device of claim 1, wherein the angle formed between the gas-introducing side wall and the gas-exhausting side wall of the adsorption vessel is in the range of from 6° to 20°.

4. The adsorption device of claim 1, wherein the angle formed between the gas-introducing side wall and the gas-exhausting side wall of the adsorption vessel is in the range of from 7° to 12°.

5. The adsorption device of claim 1, wherein the rectifying body is provided in said hopper-like portion in such a manner that the ridge line at the top of the rectifying body is aligned with a line connecting the upper flexing points of the hopper-like portion.

6. The adsorption device of claim 1, wherein the apex angle formed between the two side surfaces of the rectifying body is in the range of from 30° to 60°.

7. The adsorption device of claim 1, wherein the width of the bottom edge of the triangular cross-section of the rectifying body is larger than the width of the delivery port.

8. The adsorption device of claim 1, wherein the tapered side surfaces of said rectifying body are substantially parallel with the tapered walls of said hopper-like portion, respectively.

9. The adsorption device of claim 1, wherein said rectifying plate is extended downwardly to the point where two streams of the activated charcoal divided by the rectifying body are changed in their direction downwardly toward the delivery port.

10. The adsorption device of claim 1, wherein the angle formed between the gas-introducing side wall and the gas-exhausting side wall of the adsorption vessel is in the range of from 9° to 10°.

* * * * *